July 8, 1924.
G. ANTONI ET AL
AEROPLANE
Filed May 19, 1923
1,500,358
4 Sheets-Sheet 1
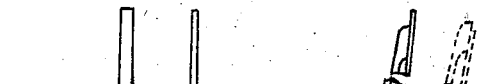
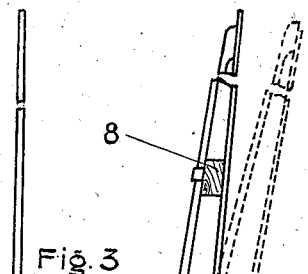
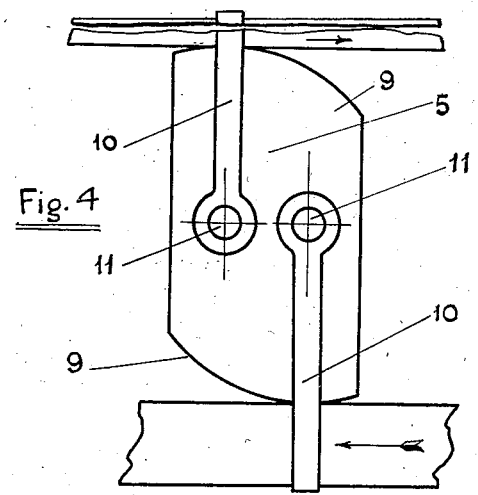
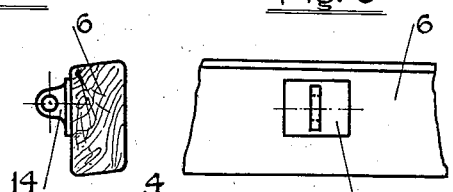
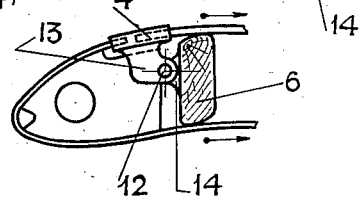
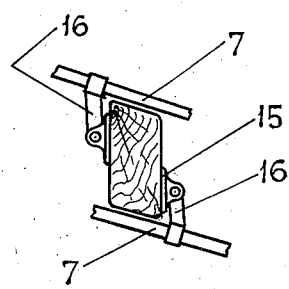
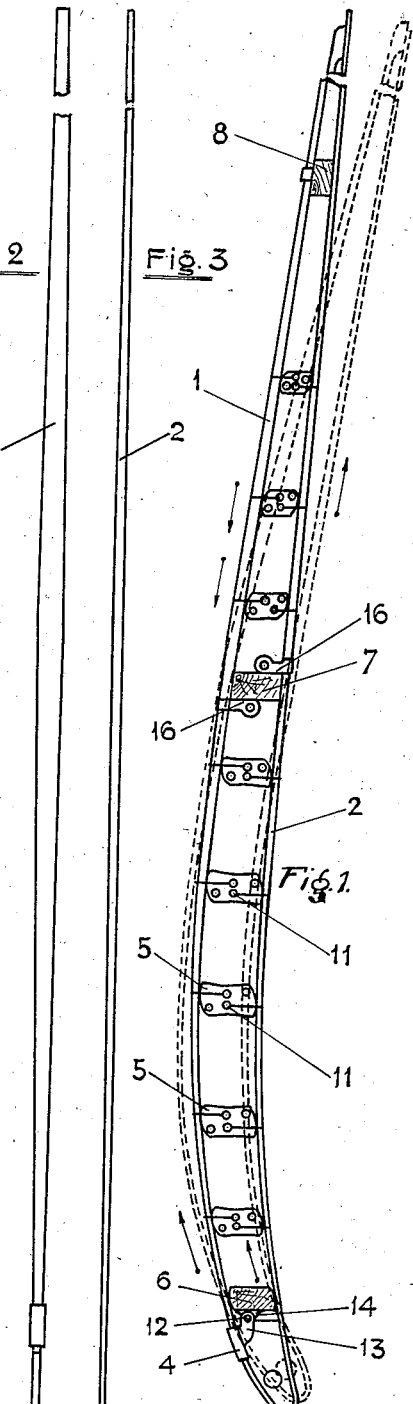

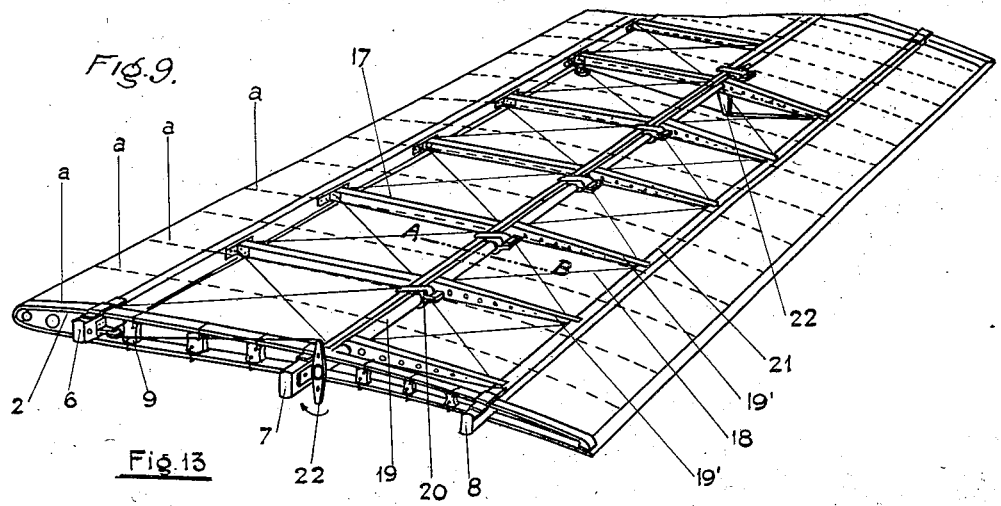
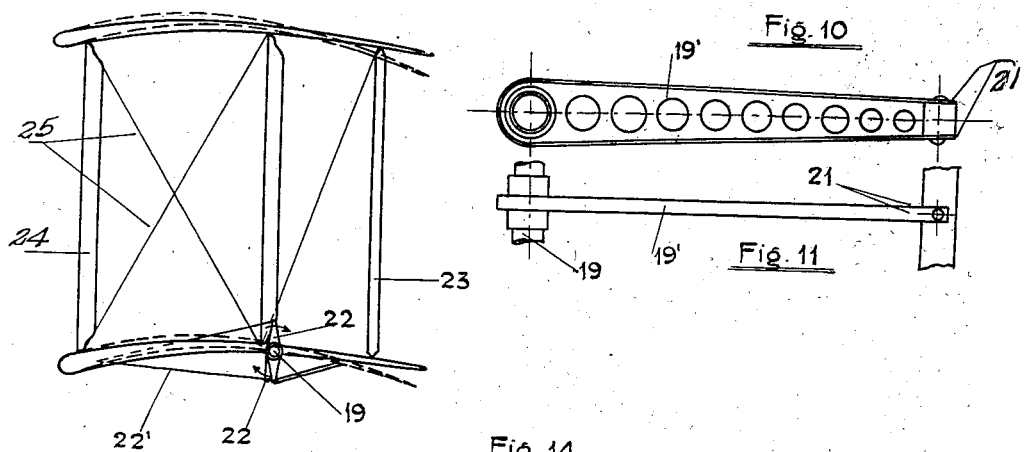
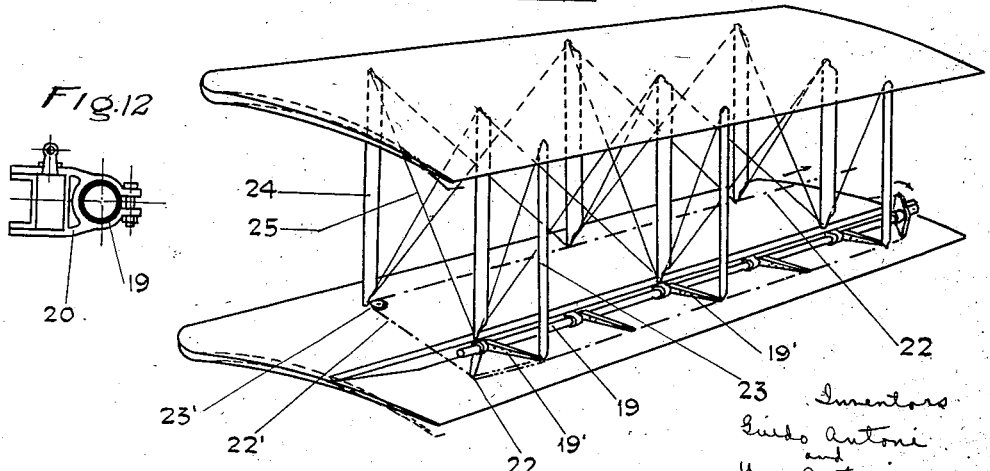

July 8, 1924.                                                                                                1,500,358
G. ANTONI ET AL
AEROPLANE
Filed May 19, 1923                          4 Sheets-Sheet 3
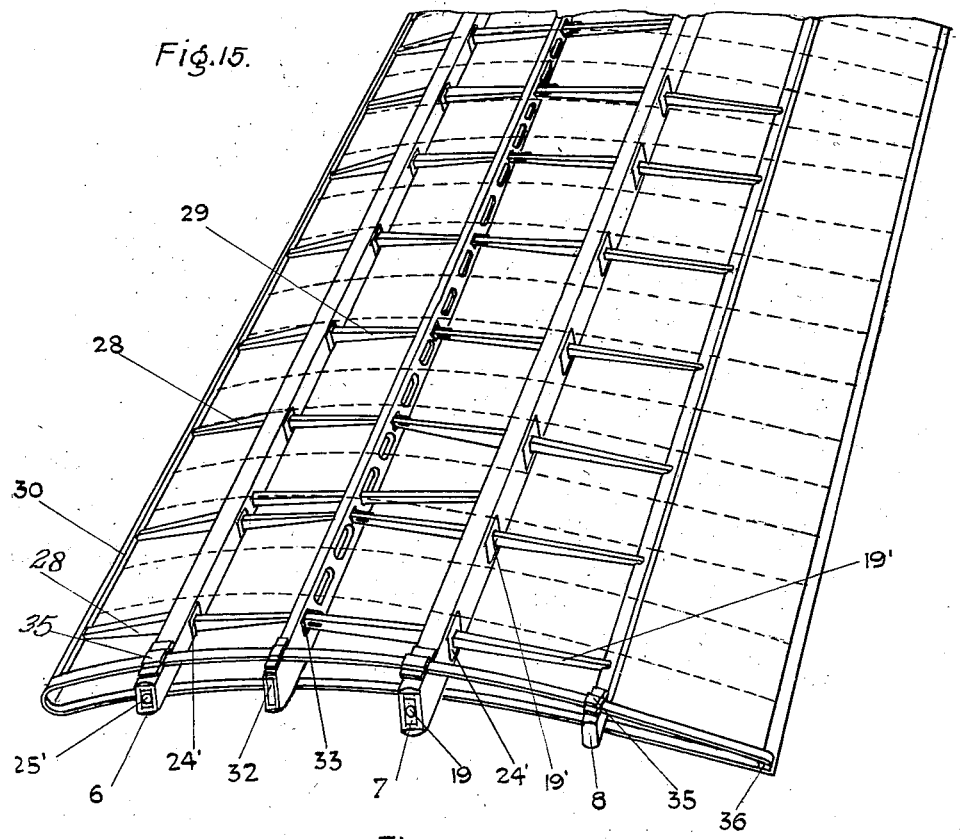
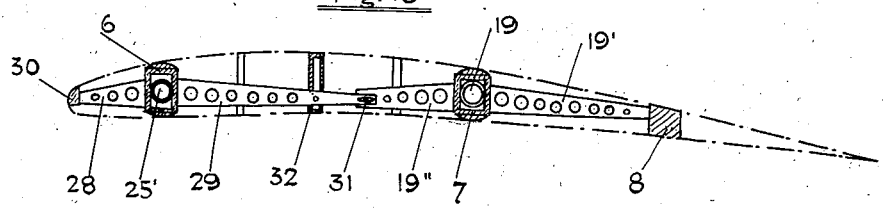
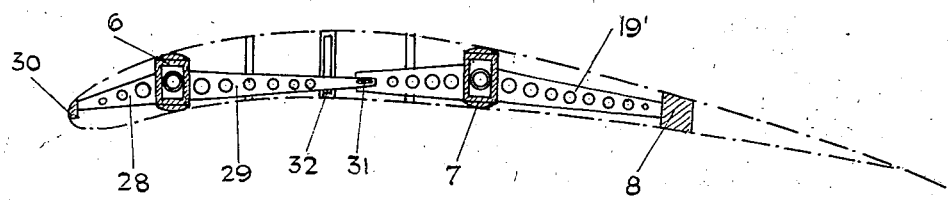

July 8, 1924.

G. ANTONI ET AL

AEROPLANE

Filed May 19, 1923

Inventors
Guido Antoni
and
Ugo Antoni
By Percy H. Moore, atty

Patented July 8, 1924.

1,500,358

UNITED STATES PATENT OFFICE.

GUIDO ANTONI AND UGO ANTONI, OF FLORENCE, ITALY.

AEROPLANE.

Application filed May 19, 1923. Serial No. 640,061.

*To all whom it may concern:*

Be it known that we, GUIDO ANTONI and UGO ANTONI, both subjects and citizens of the Kingdom of Italy, residing at Florence, Piazza Dell'Olio 1, in the county of Tuscany and State of Italy, have invented certain new and useful Improvements in and Relating to Aeroplanes, of which the following is a specification.

The present invention relates to flying machines and has for its object the construction of a resilient structure of sustention planes combined with means to vary the rate of flying speed and the supporting capacity of the machine, while the quality of solidity and stability of the machine remain unaltered.

A further object of the invention is a new arrangement of ribs on said sustention planes and means to operate the deformation of said ribs from the conductor post.

In the annexed drawings are represented forms of construction of the invention.

Fig. 1 is a side view of a sustention-plane-rib.

Figs. 2 and 3 represent details, in front and plan view of said rib.

Fig. 4 is a detail view, in larger scale, of said rib, showing the arrangement of certain parts.

Figs. 5, 6, 7 represent detail views of the connection between ribs and longérons.

Fig. 8 is a partial side view of the details shown at Fig. 5.

Fig. 9 is a perspective view of a wing-framing provided with means to operate the deformation thereof.

Figs. 10 and 11 represent in different view, one of the arms to operate said deformation.

Fig. 12 is a section, in larger scale, on line A—B of Fig. 9.

Figs. 13 and 14 represent respectively a side elevational view and a perspective view of a biplane construction provided with the improvements which form the objects of the invention.

Fig. 15 is a perspective view of an improved wing.

Figs. 16 and 17 represent in side view a rib, respectively in position of rest and in position of resilient deformation.

Figure 18:
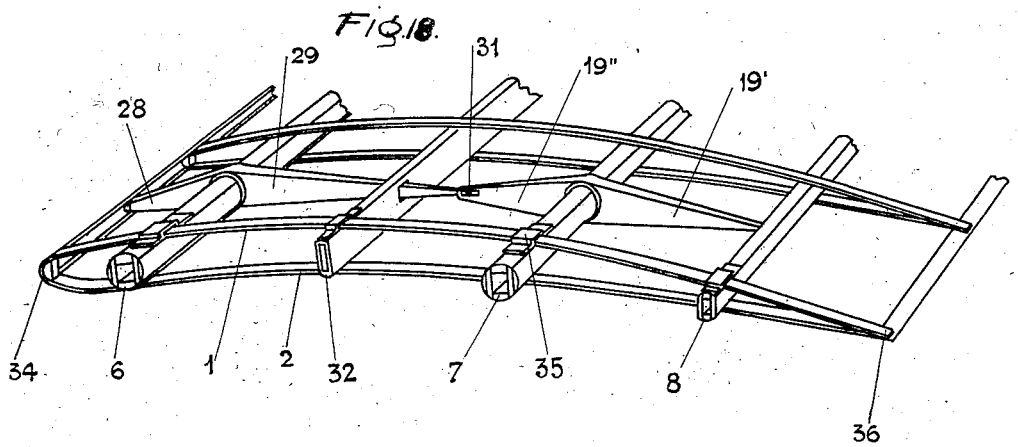
Fig. 18 shows in perspective view a second form of construction of a wing.

Referring to Figures from 1 to 8, the rib comprises two frames —1—2— preferably tapered toward their ends.

Said frames are connected afore, by head-pieces —3— fastened to the lower frame —2— but preferably, loosely joined to the upper frame —1— by means of tube-piece —4—.

As regards the cross section of the wing, it depends evidently on the form of the ribs, the latter being reinforced if necessary, by the interposition of wood-pieces —5—.

The ribs are arranged parallel to one another to build up the wing and are connected to transverse beams (longérons) —6—7—8—.

In order to allow the necessary deformation in curvature of the wing (as shown in dotted lines at Fig. 1) a special connection is provided between the pieces —5— and the frames —1—2—.

The pieces —5— sufficiently wide, have their ends shaped by way of rolling surfaces, cylindrical surfaces of suitable curvature —9— (Fig. 4).

They are tied to the frames, by means of brackets —10— surrounding the frames, and having their ends pivoted to the pieces —5— at points —11— arranged symmetrically in respect of the vertical axial plane of said piece.

The connection of the rib to the forward longéron —6— (which is provided with rolling sides) has the form of an articulation between arms —13—14—, projecting respectively from the tube-piece —4— and the longéron —6—.

Connecting ears —15— project from the middle longéron —7— and are articulated to brackets —16— tied over the frames —1—2—.

Controlling arms —19'—arranged between the middle and the forward longéron are intended to operate the deformation of the wings.

Said arms may be fastened by one end to a shaft —19— mounted laterally to the middle longéron —7— and journaled in bearings —20— fastened to the latter, the said arms ending with forks —21— connected to the rear longéron —8—.

The ends of the shaft —19— are provided with lever-arms —22— attached to the ends of cables or the like, which are operated from the driver post.

In the case of a biplane structure, as shown at Figs. 13, 14, there is no necessity of a further shaft —19— for the additional plane; in practice it should be deemed sufficient to connect the corresponding arms —19'— of the two planes, by means of rods —23—. The wing is further constructed according to known principles.

Besides the shaft —19— and the cables 22'— additional cables are then provided, guided on suitable pulleys —23'— and ending to the driver post, where a suitable gearing is provided (not shown) to act on shaft —19—.

Referring to the Figures 15, 16, 17, the pivot or shaft 19 is lodged in the interior of the longéron —7—, suitable apertures being provided across said longéron, to give passage to the arms —19'— and allow angular movements of the same.

The arms —19'— are besides extended forward, in the form of additional arms —19"—.

A further shaft —25'— is also provided and lodged within the forward longéron —6— and provided with fore and aft-arms —28—29—.

The fore arms —28—are connected to a head longéron —30— while the ends of the aft arms —29— are pivotally connected to the ends of the fore-arms —19"— at points —31—.

A slot of convenient extension is provided at said connecting points, to allow angular movements.

The longitudinal —32— is provided with suitable apertures —33— to give passage to the arm levers and permit angular movement thereof. The position of said longitudinal being regulated according to the extent of the deformation required.

To attain said deformation, in practice, slight angular rotations of the levers —19' —28— are sufficient, thus the lever ends are maintained within the inner space of the wing body.

Figure 19:
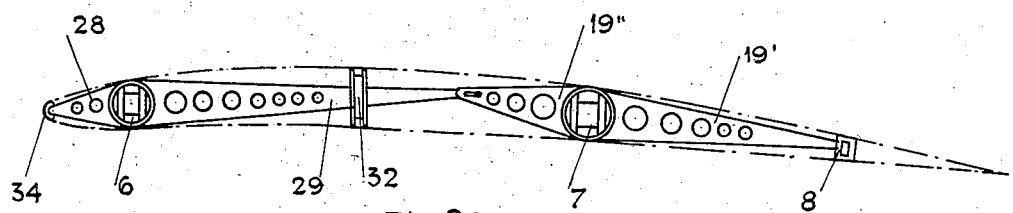
Figs. 19 and 20 show in side view a rib forming part of said second form of construction and represent the same respectively in position of rest and in position of resilient deformation.
Figure 20:
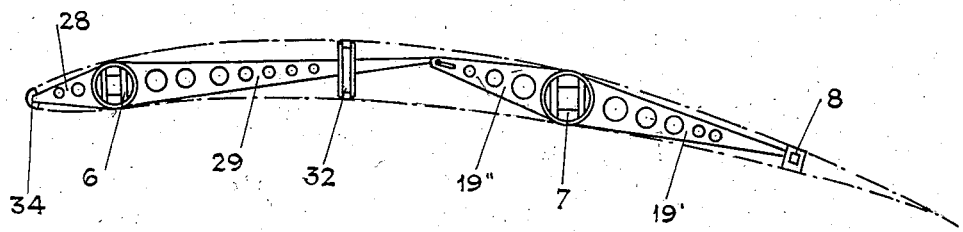

In the form of construction represented in Figures 18, 19, 20, the longérons themselves act as shafts or pivots.

To such end it is sufficient to leave them the necessary freedom of movement and shape cylindrically the upper and lower side of the same.

The head transversal —34— has preferably a slot on its rear side, receiving the ends of the fore arms.

As shown in the latter form of construction, the frames —1— and —2— may be of uniform thickness, and fastened to one another by their head ends, but left loose at their rear ends.

Brackets —35— keep the frames —1— tied to the longérons 6, 7, 8, but they leave them free of sliding longitudinally while being curved.

The resilient deformation, instead of being operated through the rotation of the shaft (as said for the former constructional forms) may be actually operated by exerting, through suitable cables, a downward pull on the ends of levers —19'—.

Having now particularly described the nature of our invention and the manner in which the same should be performed we claim:

1. An aeroplane with resilient wings, ribs composed of resilient frames forming the structure of said wings, disjunctions in said frames to allow one frame to slide on the other, bracket connections of said ribs with the longérons of the wings, transversal shafts on said wings, arranged longitudinally thereon, levers mounted on said shafts and interconnected to one another, arms of said levers extending forwards and rearwards within the body of said wings, and acting respectively on a forward longéron and a rear longéron of said wing, means to exert an angular rotation on said levers.

2. An aircraft plane having a plurality of resilient ribs formed with frames loosely abutting one another at one point, said frames being tapered from an intermediate point to their ends whereby to secure established forms of balance curvatures of said frames.

3. An aircraft plane comprising a plurality of longérons, resilient transversal ribs connected to said longérons, pairs of levers lodged within the plane, said levers bearing on certain of said longérons and having their adjacent arms articulated to one another and their free arms respectively connected to the front edge and to the rearmost longéron of the plane, suitable openings being provided in the intermediate longérons to allow the free passage and movement of said levers.

In testimony whereof we affix our signatures in presence of two witnesses.

GUIDO ANTONI. [L. S.]
UGO ANTONI. [L. S.]

Witnesses:
ALBERTA SCANOLONE,
BEATRICE DE FIGNO.